United States Patent
Elenbaas

(10) Patent No.: US 10,162,126 B2
(45) Date of Patent: Dec. 25, 2018

(54) MULTI-FIBER OPTIC CONNECTOR WITH PIVOTALLY-ALIGNED FERRULE AND RESILIENT ALIGNMENT PINS

(71) Applicant: CommScope Asia Holdings B.V., Bussum (NL)

(72) Inventor: Jacob Arie Elenbaas, Heijningen (NL)

(73) Assignee: COMMSCOPE ASIA HOLDINGS B.V. (NL)

( * ) Notice: Subject to any disclaimer, the term of this patent is extended or adjusted under 35 U.S.C. 154(b) by 0 days.

(21) Appl. No.: 15/532,204

(22) PCT Filed: Dec. 1, 2015

(86) PCT No.: PCT/EP2015/078231
§ 371 (c)(1),
(2) Date: Jun. 1, 2017

(87) PCT Pub. No.: WO2016/087449
PCT Pub. Date: Jun. 9, 2016

(65) Prior Publication Data
US 2017/0363816 A1   Dec. 21, 2017

Related U.S. Application Data

(60) Provisional application No. 62/086,005, filed on Dec. 1, 2014.

(51) Int. Cl.
*G02B 6/38* (2006.01)

(52) U.S. Cl.
CPC ......... *G02B 6/3882* (2013.01); *G02B 6/3821* (2013.01); *G02B 6/3874* (2013.01); *G02B 6/3885* (2013.01)

(58) Field of Classification Search
CPC .. G02B 6/3882; G02B 6/3821; G02B 6/3874; G02B 6/3885; G02B 6/38
See application file for complete search history.

(56) References Cited

U.S. PATENT DOCUMENTS

| | | |
|---|---|---|
| 5,408,558 A | 4/1995 | Fan |
| 5,420,954 A | 5/1995 | Swirhun et al. |
| (Continued) | | |

FOREIGN PATENT DOCUMENTS

| | | |
|---|---|---|
| CN | 1451982 A | 10/2003 |
| JP | 7-318761 A | 12/1995 |
| (Continued) | | |

OTHER PUBLICATIONS

International Search Report and Written Opinion of the International Searching Authority for corresponding International Patent Application No. PCT/EP2015/078231 dated Feb. 17, 2016, 9 pgs.

(Continued)

*Primary Examiner* — Andrew Jordan
(74) *Attorney, Agent, or Firm* — Merchant & Gould P.C.

(57) ABSTRACT

A multi-fiber connector (40) that promotes physical contact with a communicating multi-fiber connector. The multi-fiber connector (40) has a connector body (44) with a front end (47) and a back end (49). The multi-fiber connector (40) also includes a ferrule (10a, 10b) with optical contacts (20a, 20b) at a front end (14a, 14b). The ferrule (10a, 10b) is spring biased toward the front end (14a, 14b) of the connector body (44). The ferrule (10a, 10b) has a pair of alignment pin openings (30a, 30b) extending into the ferrule from a front end (14a, 14b). The ferrule (10b) also has a pair of alignment pins (22) mounted within the alignment pin openings (30a, 30b). The base ends of the alignment pins (22) have a different transverse cross-sectional shape than the alignment pin openings (30a, 30b). This difference in transverse cross-sectional shapes allows the alignment pins to pivot relative to the ferrule along a major axis of the ferrule.

18 Claims, 9 Drawing Sheets

(56) References Cited

U.S. PATENT DOCUMENTS

| | | | |
|---|---|---|---|
| 5,596,662 A | 1/1997 | Boscher | |
| 5,611,010 A | 3/1997 | Shiino et al. | |
| 5,778,123 A | 7/1998 | Hagan et al. | |
| 5,845,028 A | 12/1998 | Smith et al. | |
| 5,920,670 A | 7/1999 | Lee et al. | |
| 5,923,803 A | 7/1999 | Bunin et al. | |
| 6,146,024 A * | 11/2000 | Melchior | G02B 6/3834 385/59 |
| 6,357,933 B1 | 3/2002 | Bradley et al. | |
| 6,425,692 B1 | 7/2002 | Fujiwara et al. | |
| 6,520,686 B1 | 2/2003 | Kiani | |
| 6,619,855 B2 | 9/2003 | Dudoff et al. | |
| 6,702,479 B2 | 3/2004 | Yang | |
| 6,755,574 B2 | 6/2004 | Fujiwara et al. | |
| 6,805,493 B2 | 10/2004 | Igl et al. | |
| 6,910,812 B2 | 6/2005 | Pommer et al. | |
| 7,296,935 B1 | 11/2007 | Childers et al. | |
| 8,585,300 B2 | 11/2013 | Buijs et al. | |
| 8,768,125 B2 | 7/2014 | Beatty et al. | |
| 9,274,287 B2 | 3/2016 | Takano et al. | |
| 9,417,406 B2 * | 8/2016 | Isenhour | G02B 6/3893 |
| 9,470,852 B2 | 10/2016 | Takano et al. | |
| 9,829,646 B2 * | 11/2017 | Watte | G02B 6/3835 |
| 2002/0050716 A1 | 5/2002 | Cresswell | |
| 2002/0114589 A1 | 8/2002 | Igl et al. | |
| 2002/0150347 A1 | 10/2002 | Fujiwara et al. | |
| 2002/0186932 A1 | 12/2002 | Barnes et al. | |
| 2003/0012516 A1 | 1/2003 | Matsumoto et al. | |
| 2003/0091297 A1 | 5/2003 | Hung et al. | |
| 2003/0098045 A1 | 5/2003 | Loder et al. | |
| 2003/0161584 A1 | 8/2003 | Ohtsuka et al. | |
| 2005/0286833 A1 | 12/2005 | Kramer et al. | |
| 2006/0013538 A1 | 1/2006 | Hodge et al. | |
| 2009/0052844 A1 | 2/2009 | Van Der Steen | |
| 2011/0262075 A1 | 10/2011 | Beatty et al. | |
| 2012/0014649 A1 | 1/2012 | Duis et al. | |
| 2012/0201499 A1 | 8/2012 | Buijs et al. | |
| 2012/0257860 A1 | 10/2012 | Li et al. | |
| 2012/0328244 A1 | 12/2012 | Sasaki et al. | |
| 2013/0170797 A1 | 7/2013 | Ott | |
| 2013/0266268 A1 | 10/2013 | Li et al. | |
| 2015/0168655 A1 * | 6/2015 | Isenhour | G02B 6/3882 385/75 |
| 2015/0198773 A1 * | 7/2015 | Nakama | G02B 6/3885 385/79 |
| 2016/0187591 A1 * | 6/2016 | Fortusini | G02B 6/3821 385/77 |
| 2016/0252682 A1 * | 9/2016 | Watte | G02B 6/3823 385/65 |
| 2017/0307828 A1 * | 10/2017 | Elenbaas | G02B 6/3817 |
| 2017/0343741 A1 * | 11/2017 | Coenegracht | G02B 6/3849 |
| 2017/0363816 A1 * | 12/2017 | Elenbaas | G02B 6/3882 |
| 2018/0156983 A1 * | 6/2018 | Watte | G02B 6/3823 |
| 2018/0156986 A1 * | 6/2018 | Lu | G02B 6/3885 |

FOREIGN PATENT DOCUMENTS

| | | |
|---|---|---|
| JP | 2014-077919 A | 5/2014 |
| WO | 02/088810 A1 | 11/2002 |

OTHER PUBLICATIONS

Ryton® PPS (PolyPhenylene Sulfide) Specifications, http://www.boedeker.com/ryton_p.htm, 2 pages (Copyright 2011).

Satake, T. et al., "MPO-type single-mode multi-fiber connector: Low-loss and high-return-loss intermateability of APC-MPO connectors," Optical Fiber Technology, vol. 17, pp. 17-30 (2011).

* cited by examiner

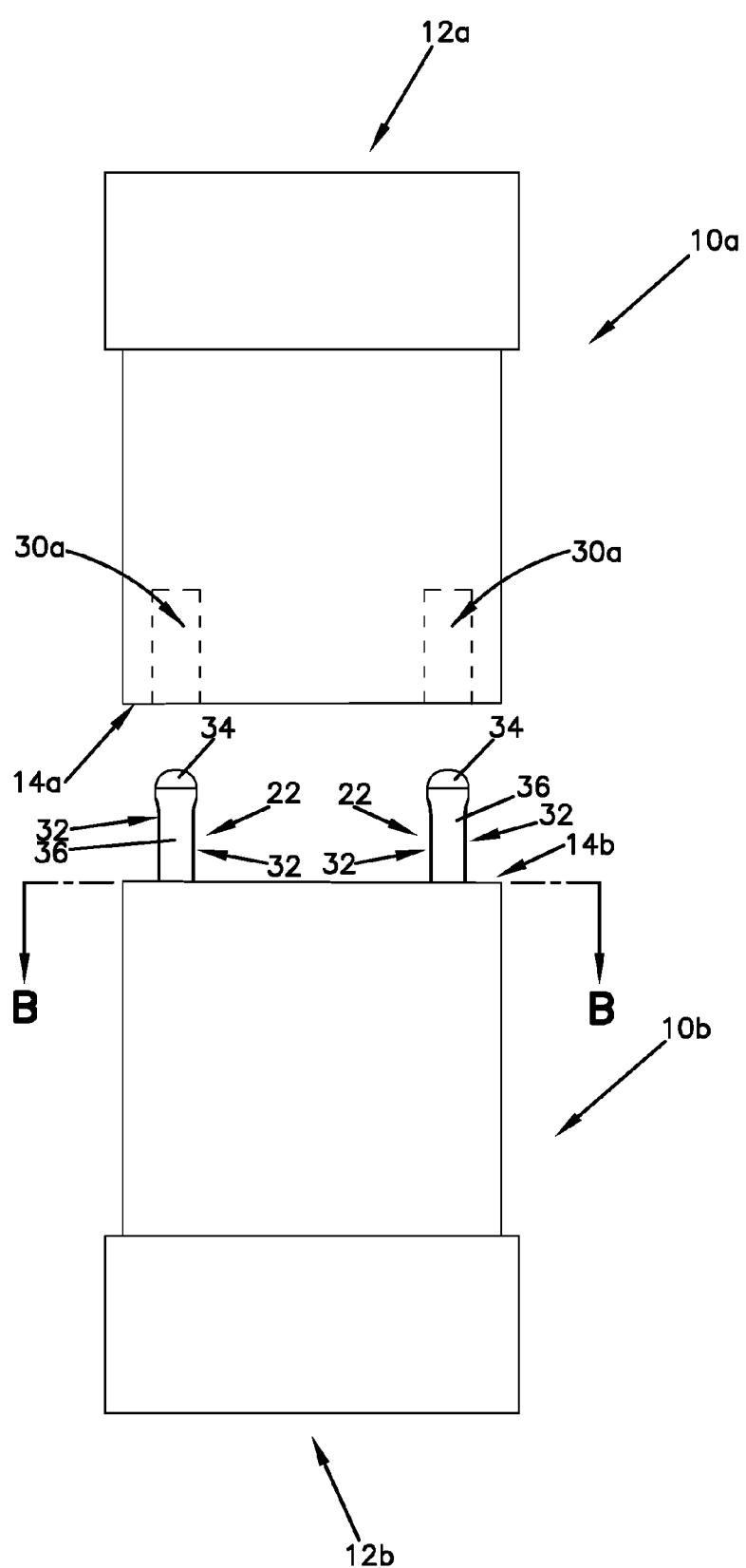

MULTI-FIBER OPTIC CONNECTOR WITH PIVOTALLY-ALIGNED FERRULE AND RESILIENT ALIGNMENT PINS

CROSS-REFERENCE TO RELATED APPLICATION

This application is a National Stage Application of PCT/EP2015/078231, filed on Dec. 1, 2015, which claims the benefit of U.S. Patent Application Ser. No. 62/086,005, filed on Dec. 1, 2014, the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to fiber optic connectors used in optical fiber communication systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respected optical fibers are coaxially aligned such that the end faces of the optical fibers directly oppose one another. In this way, an optical signal can be transmitted from optical fiber to optical fiber through the aligned end faces of the optical fibers.

Optical communication often suffers from high attenuation due to a loss of physical contact between paired multi-fiber optic connectors caused by misalignment. Alignment connection systems have been developed to improve the loss of physical contact between fiber-optic connectors. Example alignment connection systems are depicted in U.S. Pat. No. 8,768,125 and U.S. patent application Ser. No. 13/715,176. Improvements are needed to reduce attenuation and enhance optical communication through reduced misalignment.

SUMMARY

Aspects of the present disclosure relate to multi-fiber ferrules having constructions adapted to allow the interface between mated multi-fiber ferrules to pivot to provide effective physical contact between the optical fibers of the mated multi-fiber ferrules. In one example, a lack of perpendicularity between the end face of a multi-fiber ferrule and the corresponding alignment pins or alignment openings of the ferrule caused by manufacturing tolerances can prevent full face contact between the end faces of mated fiber optic connectors. Certain aspects of the present disclosure relate to ferrules and alignment pins configured such that the material of the ferrule or ferrules deforms to accommodate pivotal movement of alignment pins to achieve effective physical contact at the ferrule end faces even when a lack of perpendicularity exists between the end face of a multi-fiber ferrule and the corresponding alignment pins or alignment openings of the ferrule or ferrules.

One aspect of the present disclosure relates to a multi-fiber connector that provides enhanced physical contact with a communicating/mating multi-fiber connector. The multi-fiber connector has a connector body with a front end and a back end. The multi-fiber connector also includes a ferrule that supports optical fibers having end faces at a front end of the ferrule. The ferrule is spring biased toward the front end of the connector body. The ferrule has a pair of alignment pin openings extending into the ferrule from a front end. The ferrule also has a pair of alignment pins having base ends positioned within the alignment pin openings. The base ends of the alignment pin have different transverse cross-sectional shape than their corresponding alignment pin openings. This difference in transverse cross-sectional shapes allows the pins to pivot relative to the ferrule during mating with a corresponding multi-fiber ferrule to allow for pivotal movement between the ferrules which compensates for angular misalignment between the end faces of the ferrule caused by manufacturing tolerances. In certain examples, the portions of the ferrule supporting the alignment pins deform to accommodate pivotal movement of the alignment pins relative to the ferrule.

Another aspect of the present disclosure relates to a ferrule that is spring-loaded within a multi-fiber connector. The ferrule supports a plurality of optical fibers having end faces positioned near a contact face of the ferrule. The optical fibers can be positioned between two alignment pin openings. The ferrule has a major axis and a minor axis positioned in perpendicular to each other at the contact face. The alignment pin openings extend from the contact face into the ferrule. Alignment pins have base ends mounted/secured within the alignment pin openings such that distal tips of the alignment pins extend out of the alignment openings. The base ends of the alignment pins have a transverse cross-sectional shape with a reduced contact surface that does not contact the transverse cross-sectional shape of the alignment pin openings at pre-determined locations about the perimeters of the alignment pin openings. The reduced contact surfaces allow for angular misalignment between mated ferrules to allow for physical contact between the contact faces of the ferrules when non-perpendicularity between the alignment pins and the contact faces caused by manufacturing tolerances would otherwise prevent face-to-face contact between the mated ferrules.

A still further aspect of the present disclosure relates to a ferrule that is spring-loaded within a multi-fiber connector, and is designed to maintain physical contact with a secondary communicating ferrule. The ferrule has a contact face with a major axis and a minor axis. The ferrule has a pair of alignment pin openings and a pair of alignment pins with modified contact areas that reduce contact within the alignment pin openings. The modified contact areas provide less resistance to pin pivoting along the major axis than along the minor axis. The modified contact areas allow the ferrule contact face to maintain physical contact with the secondary communicating ferrule by affording angular misalignment between the ferrules.

BRIEF DESCRIPTION OF THE DRAWINGS

FIG. 3 is a top planar view of the pair of multi-fiber optic ferrules of FIG. 1.

DETAILED DESCRIPTION

Figure 1:
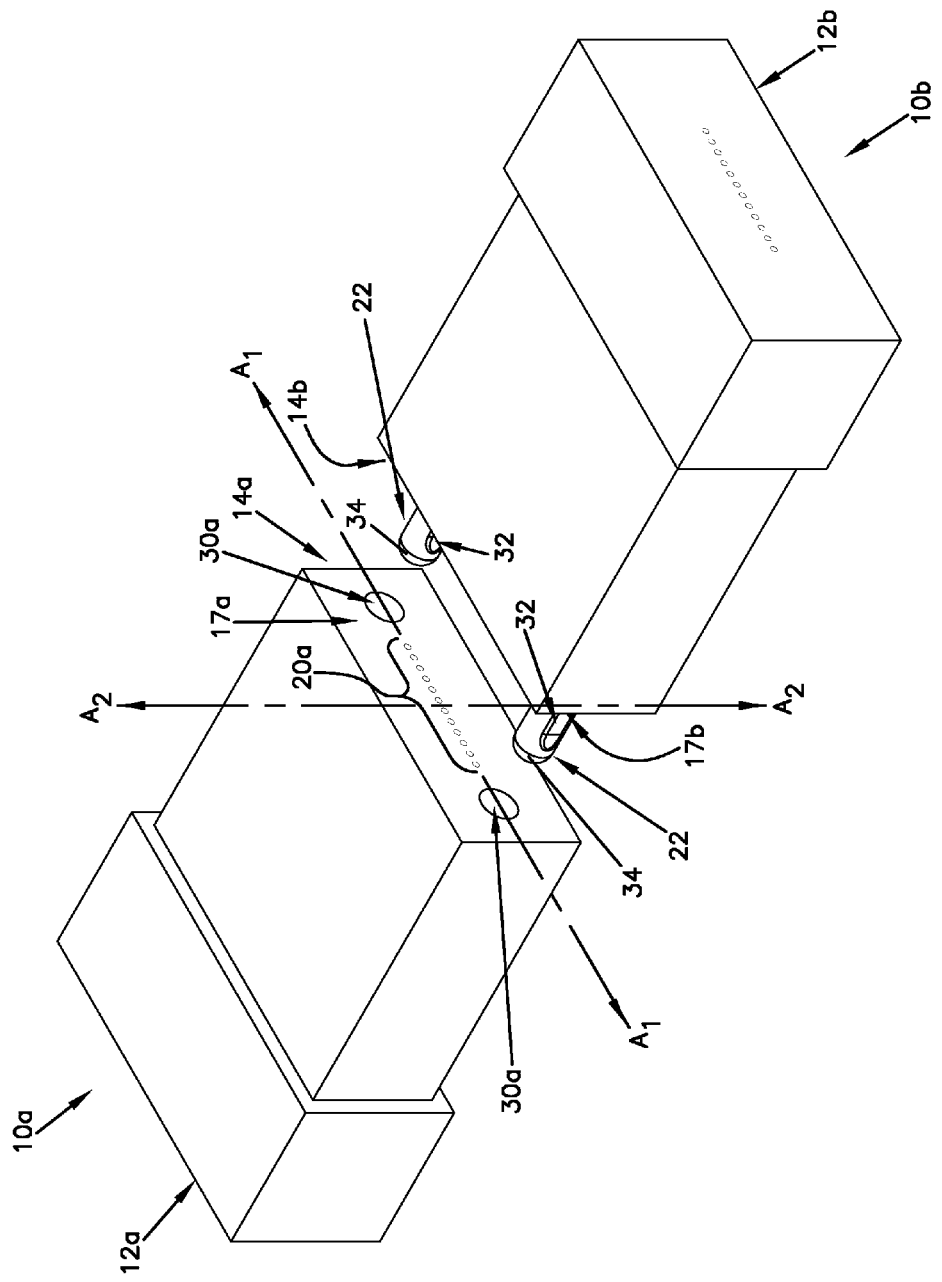
FIG. 1 is a perspective top view of a pair of multi-fiber optic ferrules in accordance with the principles of the present disclosure.
Figure 2A:
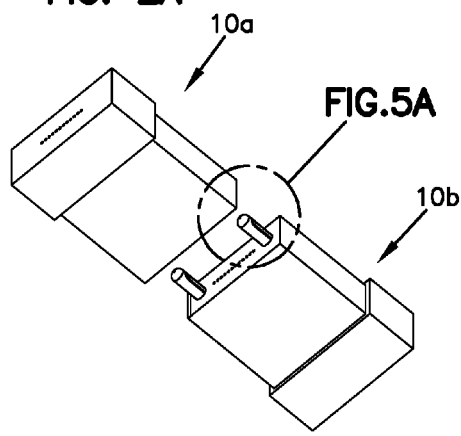
FIGS. 2A-2D show the pair of multi-fiber optic ferrules of FIG. 1, as viewed from various perspective sight lines.
Figure 2B:
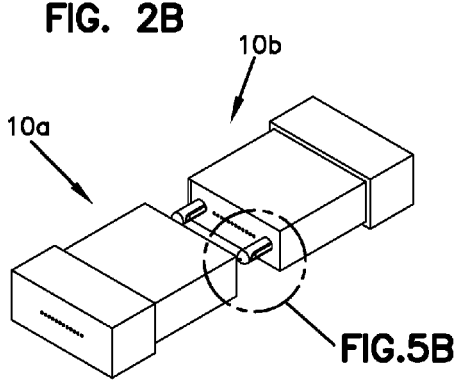
Figure 2C:
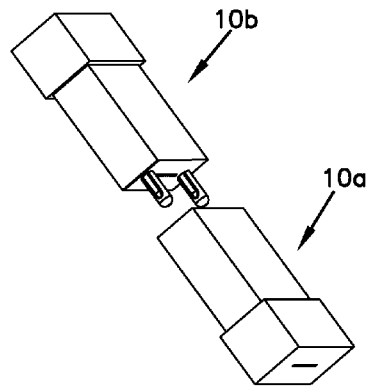
Figure 2D:
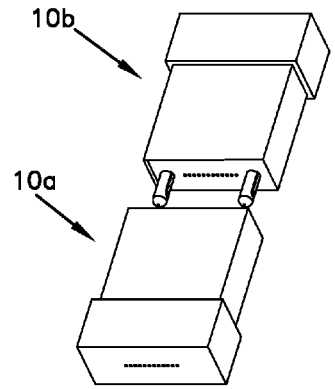
Figure 4:
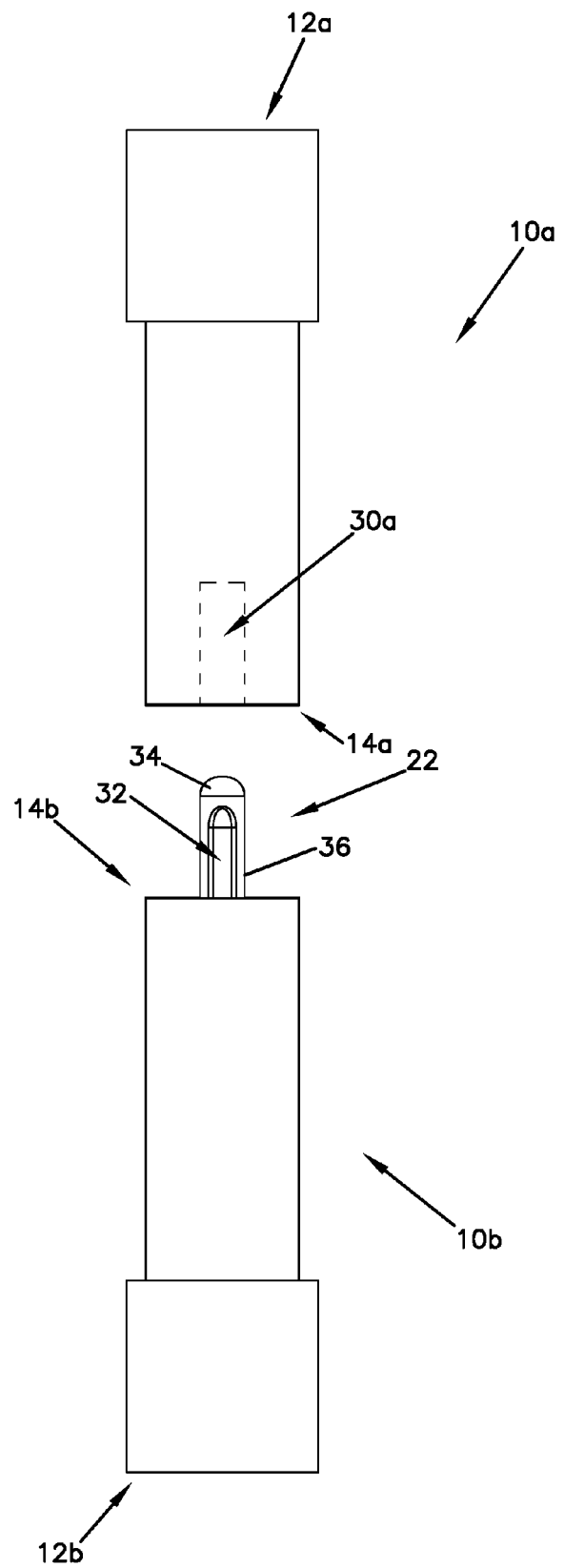
FIG. 4 is a side planar view of the pair of multi-fiber optic ferrules of FIG. 1.

Some aspects of this disclosure are directed to certain types of multi-fiber optic ferrules for use with fiber-optic connector and cable assemblies. In some implementations, for example as shown in FIGS. 1-4, 6 and 7A-7C, the disclosure may include a female ferrule 10a and a male ferrule 10b adapted to be coupled together. When the ferrules 10a, 10b are coupled together (i.e., mated) optical fibers supported by the female ferrule 10a are optically coupled to corresponding optical fibers supported by the male ferrule 10b. In certain examples of the present disclosure, the male ferrule 10b has an alignment pin mounting configuration that allows alignment pins mounted to the male ferrule to pivot relative to the ferrule body to compensate for physical characteristics of the ferrule (e.g., non-perpendicularity between the ferrule end face and the alignment pins or alignment pin openings) that would otherwise cause a gap to be present between the end faces of the mated ferrules 10a, 10b. Such physical characteristics can be the unintentional result of manufacturing tolerances.

In some aspects, the female ferrule 10a and the male ferrule 10b each may include a depth that extends from a front end 14a, 14b to a rear end 12a, 12b of the ferrule. In some aspects, the female ferrule 10a and the male ferrule 10b each may include a contact face 17a, 17b at the front end 14a, 14b of the ferrule. In some aspects, each contact face 17a, 17b may include a major dimension that extends along a major axis $A_1$ defined by the contact face and a minor dimension that extends along a minor axis $A_2$ defined by the contact face. In some aspects, the major $A_1$ and minor $A_2$ axes may be perpendicular to one another.

Figure 5A:
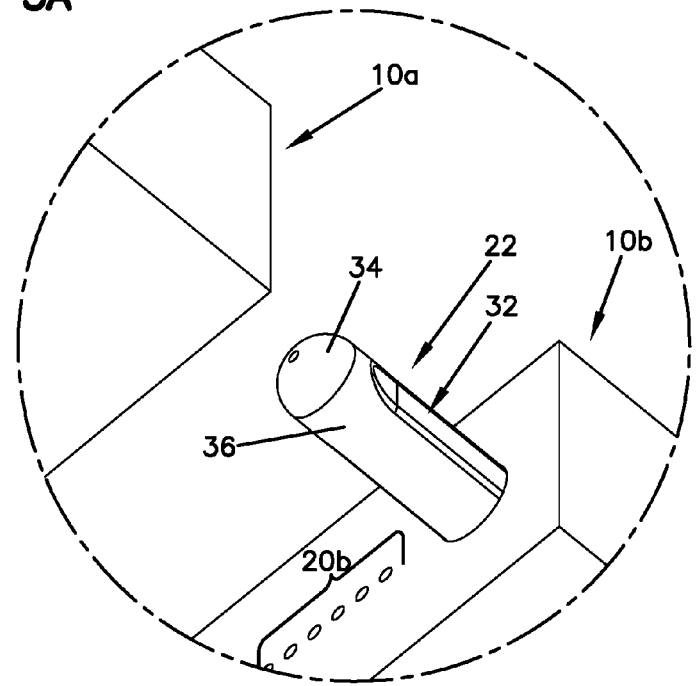
FIG. 5A is an enlarged view of one of the alignment pins, as presented in FIG. 2A.
Figure 5B:
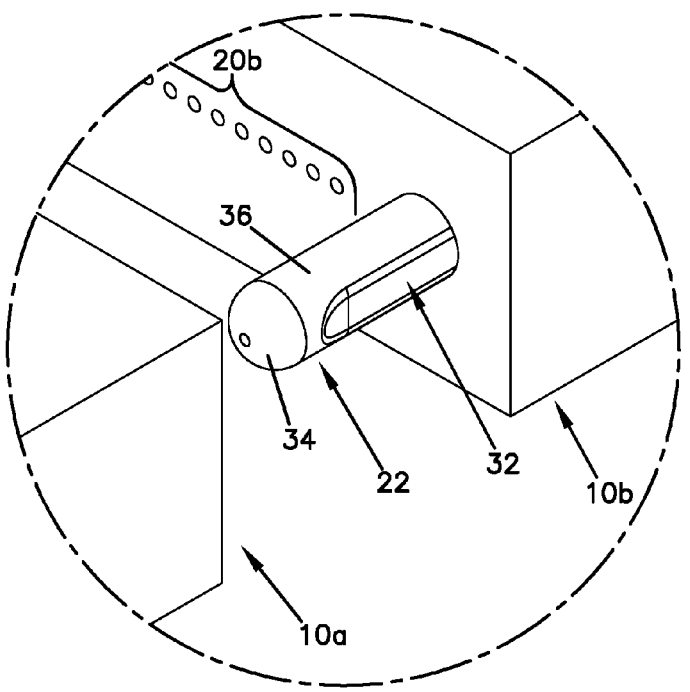
FIG. 5B is an enlarged view of one of the alignment pins, as presented in FIG. 2B.
Figure 6:
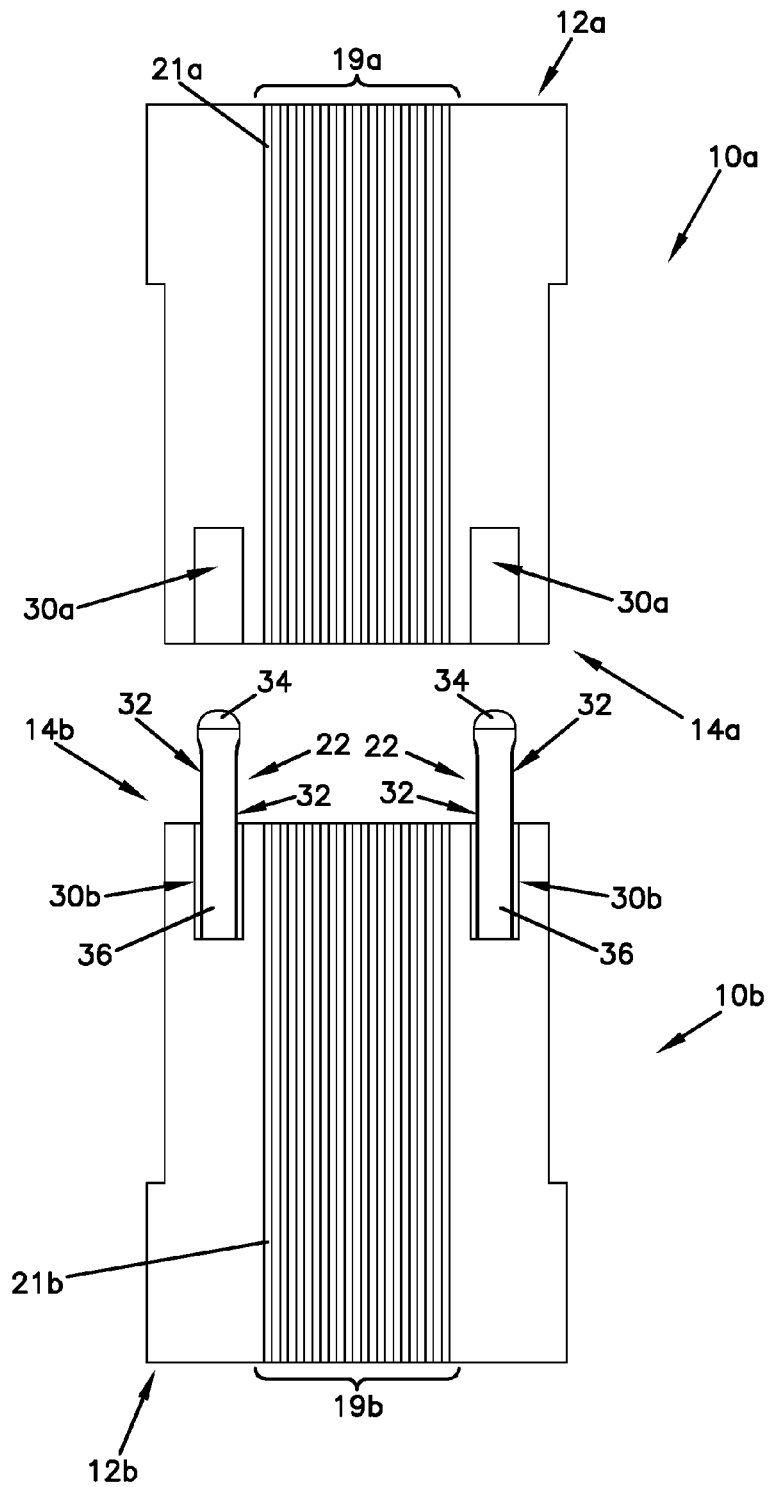
FIG. 6 is a cross-sectional top view of the pair of multi-fiber optic ferrules of FIG. 1.
Figure 7A:
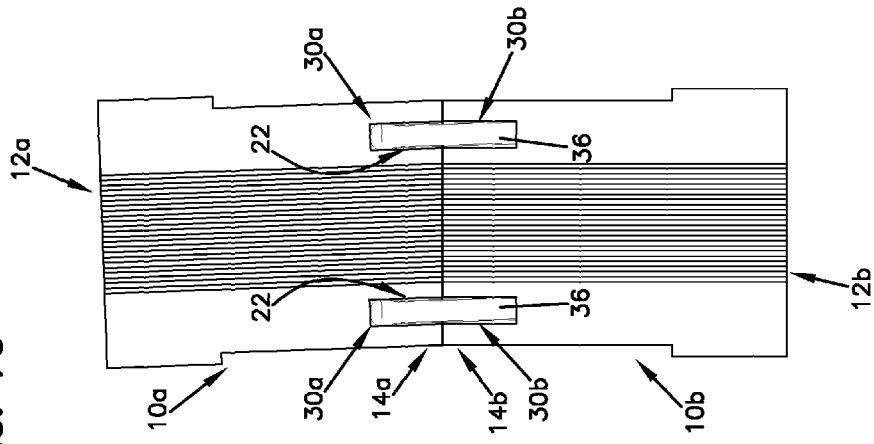
FIG. 7A is a cross-sectional top view of multi-fiber ferrules of the type shown in FIG. 1 in optically-mating communication. The depicted ferrules have been manufactured with perpendicularity between the alignment pins/alignment pin openings and the ferrule end faces so that effective end-to-end face contact of the ferrules is achieved without requiring pivoting between the ferrules.
Figure 7B:
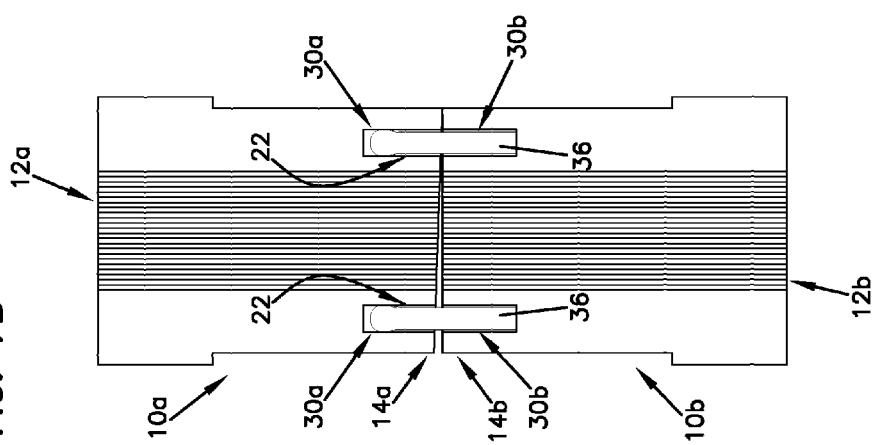
FIG. 7B is a cross-sectional top view of multi-fiber ferrules of the type shown in FIG. 1 in optically-mating communication. Due to manufacturing tolerances, at least one of the depicted ferrules has been manufactured with non-perpendicularity between the alignment pins/alignment pin openings and the ferrule end faces so that absent a flexible interface between the ferrules a gap is provided between the ferrule end faces that prevents effective end-to-end face contact of the ferrules from being achieved.
Figure 7C:
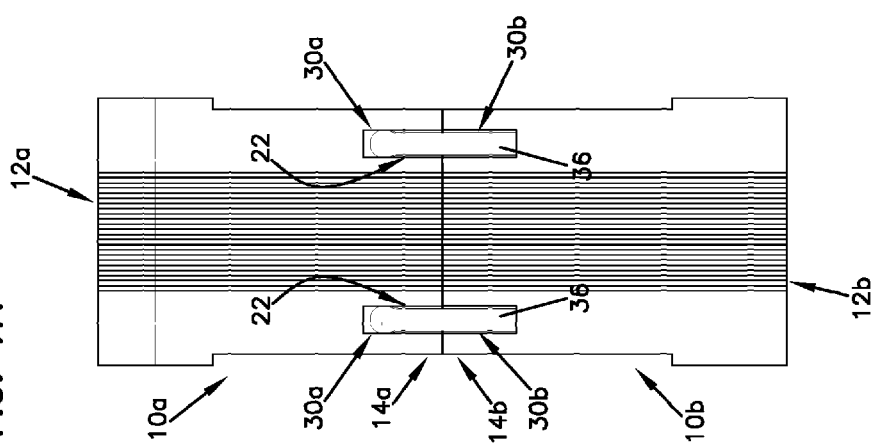
FIG. 7C shows the multi-fiber ferrules of FIG. 7C pivoted relative to one another to a position where the gap between the ferrule end faces is closed so that effective end-to end face contact of the ferrules is achieved. With effective end-to-end face contact of the ferrule end faces, the end faces of the optical fibers supported by the ferrules also make end-to-end face contact such that low-loss optical connections are made between the optical fibers. The flexible pin mounting configuration incorporated into at least one of the ferrules allows the ferrules to pivot relative to one another to close the gap between the ferrule end faces.

In some implementations, for example as shown in FIGS. 6-7C, the female ferrule 10a and the male ferrule 10b may each define fiber passages 19a, 19b that extend through the depth of the ferrule from the rear end 12a, 12b of the ferrule to the front end 14a, 14b of the ferrule. In some aspects, the fiber passages 19a, 19b may be arranged in a row that extends along the major axis $A_1$ of the contact face. In some aspects, the female ferrule 10a and the male ferrule 10b each may include a plurality of optical fibers 21a, 21b that extend through the fiber passages 19a, 19b. Example optical fibers 21a, 21b include material (e.g., a glass core surrounded by a glass cladding layer) that transmits optical information/signals. In some aspects, the optical fibers 21a, 21b may include end faces 20a, 20b (FIGS. 5A-5B) that are accessible at the contact faces at the front ends 14a, 14b of the ferrules 10a, 10b. In use, the example optical fiber end faces 20a, 20b may contact each other (FIGS. 7A, 7C) to transmit optical signals between the optical fibers 21a, 21b.

In some implementations, for example as shown in FIGS. 6-7C, the female ferrule 10a and the male ferrule 10b each may define a pair of alignment pin openings 30a, 30b. In some aspects, the alignment pin openings 30a, 30b may extend rearwardly from contact face at the front end 14a, 14b of the ferrule 10a, 10b. As depicted, the optical fibers 19a, 19b of each ferrule 10a, 10b may be positioned between each pair of alignment feature openings 30a, 30b.

In some implementations, for example as shown in FIGS. 1-9, the alignment pin openings 30a, 30b of the ferrules 10a, 10b may define a first transverse cross-sectional shape and/or size. Example first transverse cross-sectional shapes may include circular, substantially circular, oblong, etc. In some aspects, the alignment pin openings 30a, 30b for each ferrule 10a, 10b may define substantially identical transverse cross-sectional shapes and/or sizes.

In some implementations, for example as shown in FIGS. 1-9, the male ferrule 10b may include a pair of alignment pins 22, for example a pair of alignment pins 22 with distal point contacts 34 that can be rounded distal tips, and proximal base end portions 36 positioned and supported within the alignment pin openings 30b. The proximal base end portions 36 may be permanently secured within the alignment pin openings 30b. In some aspects, the distal point contacts 34 may have a different transverse cross-sectional shape from the base end portions 36. For example, as depicted, the distal point contacts 34 may have a transverse cross-sectional shape that is substantially similar to the first transverse cross sectional shape of the alignment pin openings 30a, 30b (e.g., circular). In some aspects, the base end portions 36 may have a second transverse cross-sectional shape and/or size that is different than the first transverse cross-sectional shape and/or size of the alignment pin openings 30a, 30b. Example second transverse cross-sectional shapes of the base end portions 36 may be non-circular. In certain examples, transverse cross-sectional shapes of the base end portions 36 may include flat sides (i.e., opposite parallel cutouts 32) that extend between rounded ends. Since the alignment pin openings 30b have round transverse cross-sectional shapes, the flat sides provide reduced contact areas with the body of the ferrule. In other words, the flat sides do not contact the ferrule since spacing is provided between the flat sides of the base end portions of the alignment pins 22 and the round contour of the alignment pin openings 30b.

In some implementations, for example as shown in FIGS. 1-8, an example first transverse cross-sectional shape of the pair of alignment pin openings 30a, 30b may be circular, and a corresponding example second transverse cross-sectional shape of the pair of base end portions 36 may be substantially circular with a reduced contact area, for example parallel cutouts 32 (i.e., flats) on opposing sides.

Figure 9:
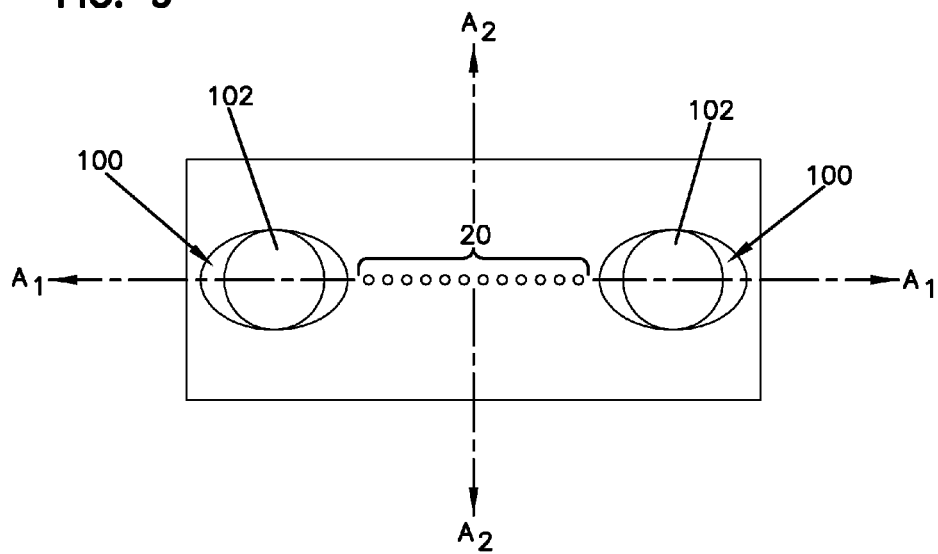
FIG. 9 is a cross-sectional view of another embodiment of a multi-fiber optic ferrule in accordance with the principles of the present disclosure.

In other implementations of the disclosure, for example as shown in FIG. 9, an example first transverse cross-sectional shape of alignment openings 100 may be oblong, and a corresponding example second transverse cross-sectional shape of alignment pin base end portions 102 may have a circular shape.

Figure 8:
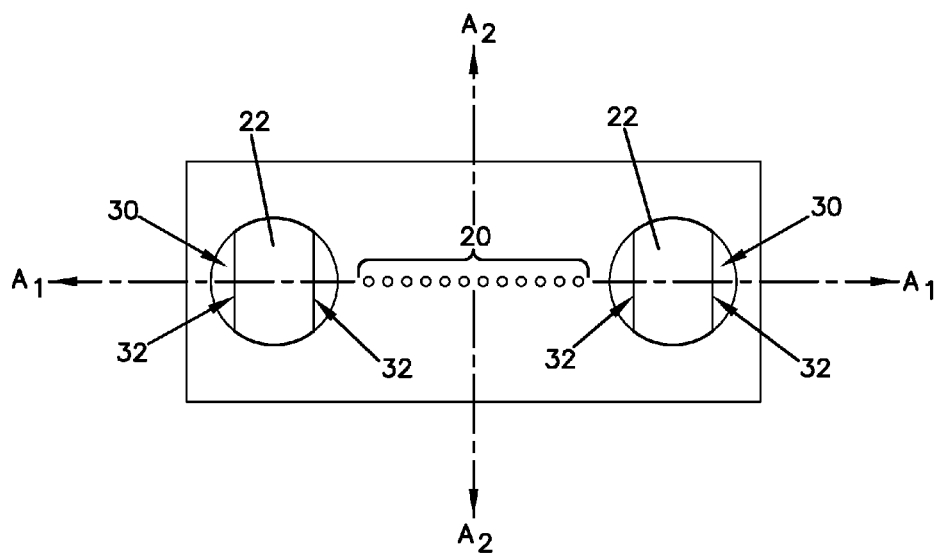
FIG. 8 is a cross-sectional view of the multi-fiber optic ferrule of FIG. 3, as viewed along sight line B.

In some implementations, the different example first and second transverse cross-sectional shapes and/or sizes may be relatively configured so that the ferrule 10b provides less resistance to the pins 22 (e.g., pins) pivoting along the major axis $A_1$ as compared to along the minor axis $A_2$. In the embodiment of FIG. 8, the interrelation between the flats 32 of the base end portions of the pins 22 and the round alignment pin openings 30b provide less contact area between the base ends of the pins 22 and the ferrule 10b along the major axis $A_1$ as compared to along the minor axis $A_2$. Thus, less material of the ferrule 10b opposes pivoting of the pins 22 relative to the ferrule 10b along the major axis $A_1$ as compared to along the minor axis $A_2$. Because a relatively small amount of ferrule material supports the pins along the major axis $A_1$, such material will deform at relatively low forces to allow the pins 22 to pivot along the major axis $A_1$. In the embodiment of FIG. 9, the interrelationship between the elongated shape of the alignment pin openings 100 and the round shape of the base ends of the pins 102 provide less contact area between the base ends of the pins 102 and the ferrule 10 along the major axis $A_1$ as compared to along the minor axis $A_2$. Thus, similar to the embodiment of FIG. 8, the pins 102 can pivot more easily relative to the ferrule along the major axis $A_1$ as compared to along the minor axis $A_2$.

In some aspects, the reduced contact area of the alignment pins 22 weakens the stiffness in the direction along the major axis $A_1$. In some aspects, the reduced contact area of the alignment features 22 causes the distal tips 34 to be point contacts within the female ferrule alignment openings 30 when the example ferrules 10a, 10b are in contact engagement.

Figure 10A:
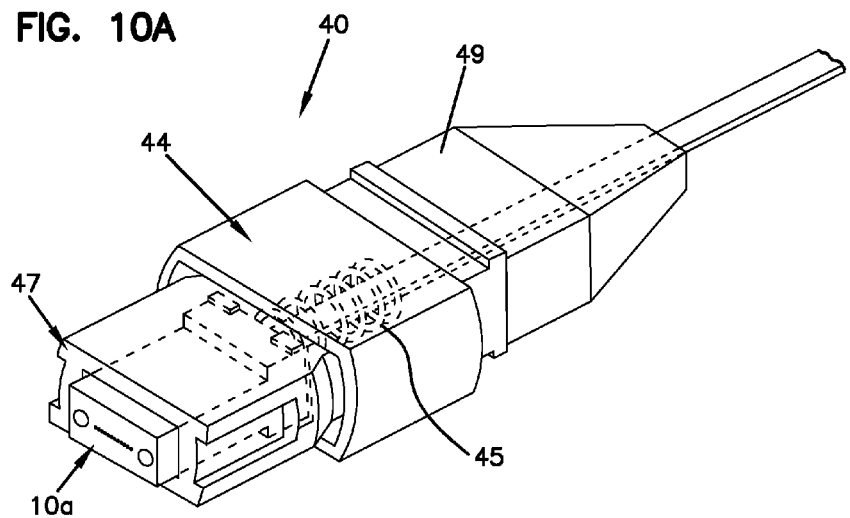
FIGS. 10A-10B show perspective top views of the multi-fiber optic ferrules of FIG. 1, shown with each ferrule mounted within a respective fiber-optic connector.
Figure 10B:
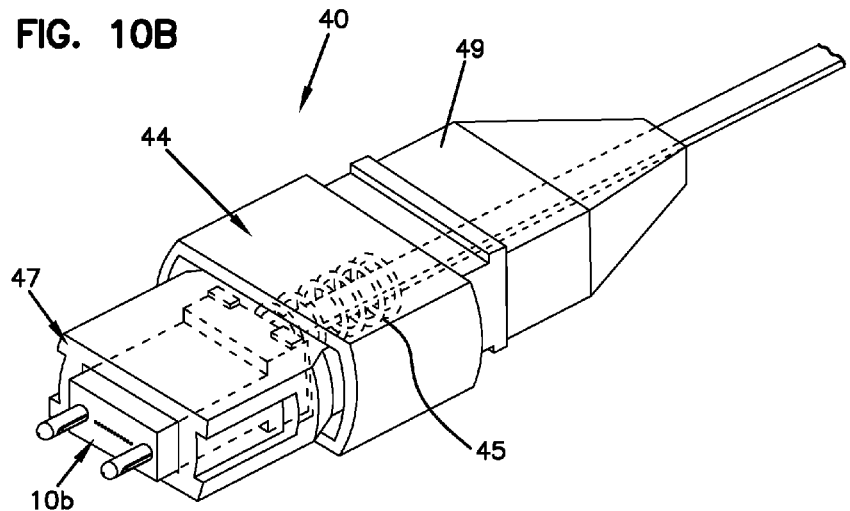

In accordance with some implementations, for example as shown in FIGS. 10A and 10B, the disclosure may include a fiber optic connector 40 that includes a connector body 44 with a front end 47 and a back end 49. In some aspects, each example ferrule 10a, 10b may be mounted at the front end 47 of one connector body 44. In some aspects, a spring 45 may bias the example ferrule 10a, 10b in a forward direction relative to the connector body 44.

In a multi-fiber connector, ideally perpendicularity is provided between the alignment pins/alignment pin openings and the end faces of the ferrules. When such perpendicularity exists, then effective end-to-end contact is provided between the end faces of mated ferrules and physical contact is provided between all of the optical fibers intended to be optically coupled together by the mated multi-fiber optical connectors (see FIG. 7A). In the situation of FIG. 7A, perpendicularity exits and three is no need to pivot the ferrules relative to one another to ensure that physical contact is provided between the end faces of the all the optical fibers.

Due to manufacturing tolerances, perpendicularity is not always present between the alignment pins/alignment pin openings and the end faces of the ferrules. When a lack of perpendicularity exists, when two multi-fiber ferrules are mated, an angular gap exists between the end faces of the mated multi-fiber ferrules (see FIG. 7B). Due to the relatively long length of the ferrules along the major axis $A_1$, the gap is exaggerated at one end of the row of optical fibers thereby causing a substantial spacing between the end faces of the optical fibers located at that end (i.e., effective end-to-end contact is not provided between the end faces of the ferrules). This type of spacing can cause substantial attenuation losses. To correct this issue, resilient pin mounting configurations in accordance with the principles of the present disclosure allows the mated ferrules to pivot relative to one another to close the gap (see FIG. 7C) and provide effective end-to-end contact between the ferrule end faces. The reduced pin support provided along the major axis $A_1$ allows the material of the male ferrule to deform when the ferrules 10a, 10b are pressed together by the springs 45 thereby allowing the ferrules to move from the position of FIG. 7B to the position of FIG. 7C. Thus, the spring force provided by the springs 45 is greater than the force required to deform the material of the ferrule supporting the base ends of the alignment pins along the major axis $A_1$. Thus, the springs 45 provide the force needed to pivot the ferrules 10a, 10b from the position of FIG. 7B to the position of FIG. 7C.

It will be appreciated that in the position of FIG. 7C, pivoting of the ferrules 10a, 10b causes the ferrules 10a, 10b to be slightly angularly misaligned (i.e., the central longitudinal axes of the ferrules are slightly angled relative to one another). Despite the slight angular misalignment, the physical contact between the optical fibers provided in this orientation results in a low-loss optical coupling.

It is noted that the pins can be pivoted more easily along the major axis $A_1$ as compared to along the minor axis $A_2$. The ability to pivot along the major axis $A_1$ as compared to the minor axis $A_2$ is important because the relatively long length of the ferrules on the major axis $A_1$ exaggerates physical contact issues related to non-perpendicularity. Thus, slight lacks of non-perpendicularity along the major axis $A_1$ can result in substantial spacings between optical fibers. This is less of an issue along the relatively short minor axis $A_2$ so the ability to pivot the ferrules in this orientation is less significant.

PARTS LIST

10a—Female ferrule
10b—Male ferrule

12a—Female ferrule rear end
12b—Male ferrule rear end
14a—Female ferrule front end
14b—Male ferrule front end
17a—Female ferrule contact face
17b—Male ferrule contact face
19a—Female ferrule fiber passage
19b—Male ferrule fiber passage
20a—Female ferrule fiber end face
20b—Male ferrule fiber end face
21a—Female ferrule optical fiber
21b—Male ferrule optical fiber
22—Alignment pin
30a—Female ferrule alignment pin opening
30b—Male ferrule alignment pin opening
32—Pin flat/cutaway
34—Pin distal point contact
36—Pin proximal base end portion
40—Fiber optic connector
44—Fiber optic connector body
45—Spring
47—Fiber optic connector body front end
49—Fiber optic connector body back end
100—Oblong alignment pin opening
102—Circular pin base end portion

What is claimed is:

1. A multi-fiber optic connector comprising:
a connector body having a front end and a back end;
a ferrule mounted at the front end of the connector body, the ferrule including a depth that extends from a front end to a rear end of the ferrule, the ferrule including a contact face at the front end of the ferrule, the contact face including a major dimension that extends along a major axis defined by the contact face and a minor dimension that extends along a minor axis defined by the contact face, the major and minor axes being perpendicular to one another, the ferrule defining fiber passages that extend through the depth of the ferrule from the rear end of the ferrule to the front end of the ferrule, the fiber passages being arranged in a row that extends along the major axis of the contact face, the ferrule also defining alignment pin openings that extend rearwardly from the front end of the ferrule, the alignment pin openings defining first transverse cross-sectional shapes;
a spring for biasing the ferrule in a forward direction relative to the connector body;
a plurality of optical fibers that extend through the fiber passages of the ferrule, the optical fibers having end faces accessible at the front end of the ferrule; and
alignment pins having base end portions positioned within the alignment pin openings, the base end portions having second transverse cross-sectional shapes that are different than the first transverse cross-sectional shapes, the different first and second transverse cross-sectional shapes being relatively configured so that the ferrule provides less resistance to alignment pin pivoting along the major axis as compared to along the minor axis.

2. The multi-fiber optic connector of claim 1, wherein the first and second transverse cross-sectional shapes are relatively shaped such that a reduced contact area is provided between the alignment pins and the ferrule along the major axis as compared to along the minor axis.

3. The multi-fiber optic connector of claim 2, wherein the first transverse cross-section shapes are round and the second transverse cross-sectional shapes include flats intersected by the major axis.

4. The multi-fiber optic connector of claim 3, wherein the reduced contact area comprises a pair of oppositely-positioned cutouts.

5. The multi-fiber optic connector of claim 1, wherein the second transverse cross-sectional shape is circular and the second transverse cross-sectional shape is elongated in a direction along the major axis.

6. The multi-fiber optic connector of claim 1, wherein the alignment pins openings are positioned with the plurality of fiber passages there between.

7. The multi-fiber optic connector of claim 1, wherein the ferrule deforms to allow the alignment pins to pivot along the major axis.

8. The multi-fiber optic connector of claim 1, wherein spacings are provided between the base ends of the alignment pins and the ferrules along the major axis.

9. The multi-fiber optic connector of claim 1, wherein first and second spacings are provided on opposite sides of each alignment pin within each of the alignment pin openings, the first and second spacings being located between the base ends of the alignment pins and the ferrules and being intersected by the major axis.

10. A multi-fiber optic connector comprising:
a male ferrule, the male ferrule including a depth that extends from a front end to a rear end of the male ferrule, the male ferrule including a contact face at the front end of the male ferrule, the contact face including a major dimension that extends along a major axis defined by the contact face and a minor dimension that extends along a minor axis defined by the contact face, the major and minor axes being perpendicular to each other, the male ferrule defining fiber passages that extend through the depth of the male ferrule from the rear end of the male ferrule to the front end of the male ferrule, the fiber passages being arranged in a row that extends along the major axis of the contact face, the male ferrule also defining alignment pin openings that extend rearwardly from the front end of the male ferrule, the alignment pin openings defining first transverse cross-sectional shapes;
a plurality of optical fibers that extend through the fiber passages of the male ferrule, the optical fibers having end faces accessible at the front end of the male ferrule; and
alignment pins having base end portions permanently secured within the alignment pin openings, the base end portions having second transverse cross-sectional shapes that are different than the first transverse cross-sectional shapes, the different first and second transverse cross-sectional shapes being relatively configured so that the male ferrule provides less resistance to alignment pin pivoting in both directions along the major axis as compared to either direction along the minor axis;
wherein spacings are provided between the base ends of the alignment pins and the male ferrule along the major axis.

11. The multi-fiber optic connector of claim 10, wherein the first and second transverse cross-sectional shapes are relatively shaped such that a reduced contact area is provided between the alignment pins and the male ferrule along the major axis as compared to along the minor axis.

12. The multi-fiber optic connector of claim 11, wherein the first transverse cross-sectional shapes are round and the second transverse cross-sectional shapes include flats intersected by the major axis.

13. The multi-fiber optic connector of claim 12, wherein the reduced contact area comprises a pair of oppositely-positioned cutouts.

14. The multi-fiber optic connector of claim 10, wherein the second transverse cross-sectional shape is circular and the first transverse cross-sectional shape is elongated in a direction along the major axis.

15. The multi-fiber optic connector of claim 10, wherein the alignment pins openings are positioned with the plurality of fiber passages therebetween.

16. The multi-fiber optic connector of claim 10, wherein the male ferrule deforms to allow the alignment pins to pivot along the major axis.

17. The multi-fiber optic connector of claim 10, wherein the spacings include first and second spacings that are provided on opposite sides of each alignment pin within each of the alignment pin openings, the first and second spacings being located between the base ends of the alignment pins and the male ferrule and being intersected by the major axis.

18. The multi-fiber optic connector of claim 10, further comprising:
   a connector body having a front end and a back end; and
   a spring for biasing the ferrule in a forward direction relative to the connector body.

\* \* \* \* \*